United States Patent
Woodfill et al.

(10) Patent No.: US 7,664,315 B2
(45) Date of Patent: Feb. 16, 2010

(54) INTEGRATED IMAGE PROCESSOR

(75) Inventors: John Iselin Woodfill, Palo Alto, CA (US); Ronald John Buck, Fremont, CA (US); Gaile Gibson Gordon, Palo Alto, CA (US); David Walter Jurasek, Banks, OR (US); Terrence Lee Brown, Portland, OR (US)

(73) Assignee: Tyzx, Inc., Menlo Park, CA (US)

( * ) Notice: Subject to any disclaimer, the term of this patent is extended or adjusted under 35 U.S.C. 154(b) by 332 days.

(21) Appl. No.: 11/264,760

(22) Filed: Oct. 31, 2005

(65) Prior Publication Data
US 2006/0153450 A1 Jul. 13, 2006

Related U.S. Application Data

(60) Provisional application No. 60/624,954, filed on Nov. 3, 2004.

(51) Int. Cl.
*G06K 9/00* (2006.01)
*G06K 9/36* (2006.01)

(52) U.S. Cl. ............ 382/154; 382/285; 382/303; 345/419; 356/12; 348/42; 359/462

(58) Field of Classification Search ............ 382/154, 382/285, 303, 304; 345/419–427; 356/12–14; 348/42–60; 359/462–477
See application file for complete search history.

(56) References Cited

U.S. PATENT DOCUMENTS

| 3,901,959 | A | | 8/1975 | Helava et al. | |
|---|---|---|---|---|---|
| 4,574,394 | A | * | 3/1986 | Holsztynski et al. | ........ 382/303 |
| 5,557,684 | A | | 9/1996 | Wang et al. | |
| 6,556,704 | B1 | | 4/2003 | Chen | |
| 6,661,918 | B1 | * | 12/2003 | Gordon et al. | ............. 382/173 |
| 6,788,809 | B1 | * | 9/2004 | Grzeszczuk et al. | ......... 382/154 |
| 2004/0208364 | A1 | * | 10/2004 | Haque et al. | ................ 382/171 |
| 2005/0128196 | A1 | * | 6/2005 | Popescu et al. | ............. 345/420 |

FOREIGN PATENT DOCUMENTS

DE 299 12 572 U1 9/1999

* cited by examiner

*Primary Examiner*—Aaron W Carter
(74) *Attorney, Agent, or Firm*—Van Pelt, Yi & James LLP

(57) ABSTRACT

An integrated image processor implemented on a substrate is disclosed. An input interface is configured to receive pixel data from two or more images. A pixel handling processor disposed on the substrate is configured to convert the pixel data into depth and intensity pixel data. In some embodiments, a foreground detector processor disposed on the substrate is configured to classify pixels as background or not background. In some embodiments, a projection generator disposed on the substrate is configured to generate a projection in space of the depth and intensity pixel data.

27 Claims, 4 Drawing Sheets

US 7,664,315 B2

INTEGRATED IMAGE PROCESSOR

CROSS REFERENCE TO OTHER APPLICATIONS

This application claims priority to U.S. Provisional Patent Application No. 60/624,954 entitled DEEPSEA G2 SYSTEM OVERVIEW filed Nov. 3, 2004 which is incorporated herein by reference for all purposes.

BACKGROUND OF THE INVENTION

Processing information of two (or more) images of the same scene, which originate from cameras slightly separated from one another, can yield depth information for objects in the images. The processing of these images is computationally intensive and requires the handling of large amounts of data. Typically, the processing has substantial latency because it involves a series of calculations where one type of calculation is performed over an entire image before moving on to a next type calculation. In addition, the output arrays from these calculations are usually large, sometimes including for each position in the image, depth information, intensity information, and color information. It would be useful to reduce the output arrays to ease calculation requirements for subsequent processing. It would also be useful to enable real-time image processing by reducing the latency.

BRIEF DESCRIPTION OF THE DRAWINGS

Various embodiments of the invention are disclosed in the following detailed description and the accompanying drawings.

DETAILED DESCRIPTION

Figure 1:
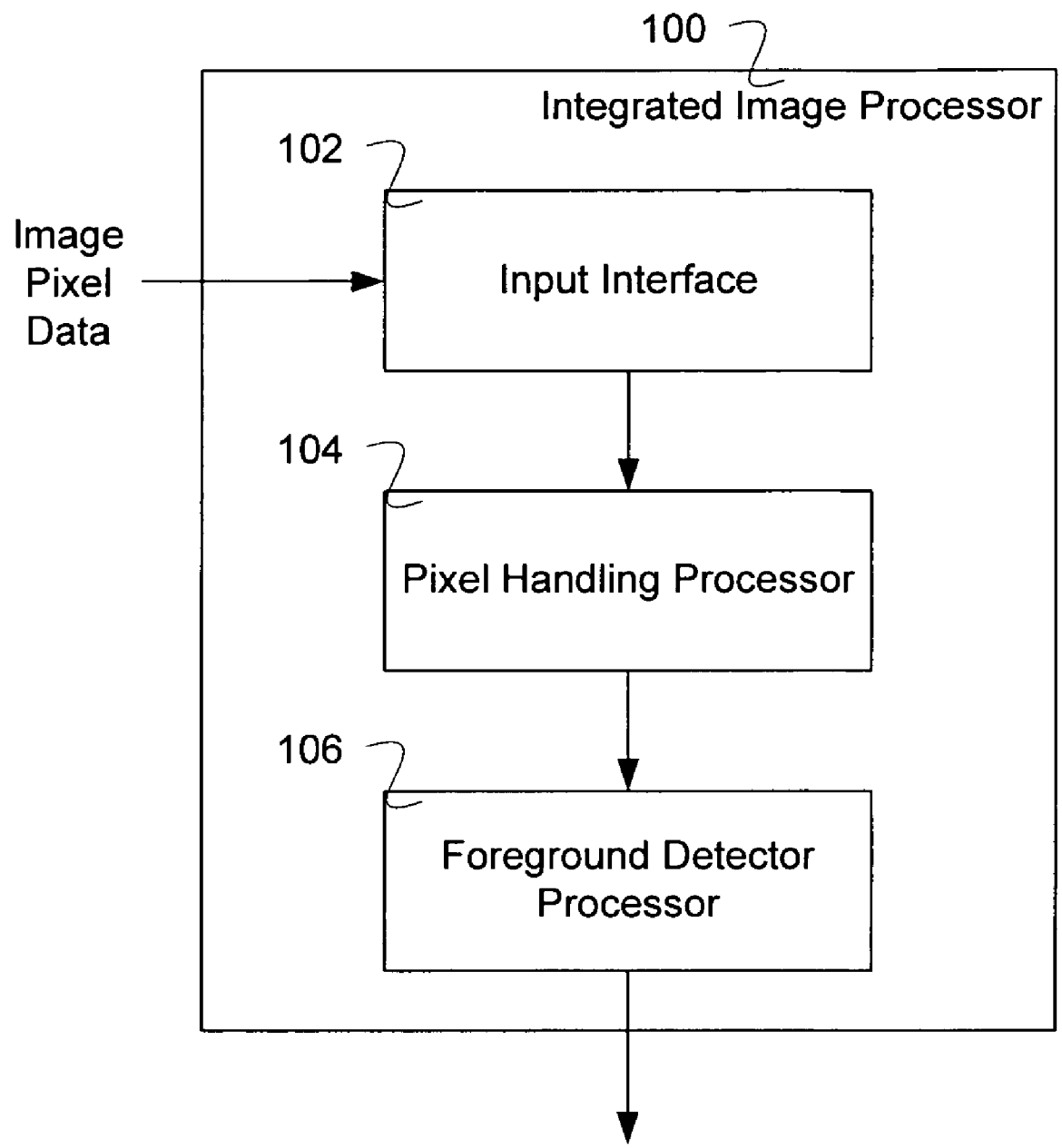
FIG. 1 is a block diagram illustrating an embodiment of an integrated image processor.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An integrated image processor implemented on a substrate is disclosed. An input interface is configured to receive pixel data from two or more images. A pixel handling processor disposed on the substrate is configured to convert the pixel data into depth and intensity pixel data. In some embodiments, a foreground detector disposed on the substrate is configured to classify pixels as foreground or not foreground. In some embodiments, a projection generator disposed on the substrate is configured to generate a projection of the depth and intensity pixel data. In some embodiments, a segmentation processor disposed on the substrate is configured to generate a list of objects and their descriptions including height, extent, number, and/or color. In various embodiments, an application processor disposed on the substrate is configured to use results of the other processors to produced outputs for user applications such as count people, count cars, count objects, detect objects, track objects, identify obstacles, detect navigable paths for vehicles, and or identify tailgaters through a door.

In various embodiments, the source of the images (for example, a camera) does not change location between images and an object of interest does not change locations between images; the source of the images does not change location between images and an object of interest does change locations between images; the source of the images does change location between images and an object of interest does not change locations between images; and the source of the images does change locations between images and an object of interest does change locations between images.

FIG. 1 is a block diagram illustrating an embodiment of an integrated image processor. In the example shown, integrated image processor 100 includes input interface 102, pixel handling processor 104, and foreground detector processor 106. Input interface 102 inputs include pixel data from two or more sources. The sources provide image data that allow depth information to be calculated. In some embodiments, the pixel data include intensity information, color information (for example, red, green, blue, luminance, other spectral bands such as UV or thermal IR, chrominance, saturation, and/or intensity information), vertical synchronization information, and horizontal synchronization information. In some embodiments, there are two sources, stereo sources, providing image data. In various embodiments, each source produces an image of 512×512 pixels occurring 20 or 200 times per second. In various embodiments, source data size is 512× 2048 with 8-bit or 10-bit pixels. In various embodiments, the separation between two source cameras is 3 cm, 5 cm, 22 cm, or 33 cm. In various embodiments, the field of view is 45 degrees or 50 degrees based at least in part on the lens of the image source. Input interface 102 outputs pixel data to pixel handling processor 104. Pixel handling processor 104 output(s) include one or more of the following: depth information, disparity information, data validity information, and image characteristics such as average intensity. Pixel handling processor 104 grabs the one or more images of pixel data, rectifies the one or more images by removing distortions from lenses and cameras based on calibration parameters, and calculates depth or disparity. Foreground detector processor 106 inputs include depth information or disparity information, and/or data validity information. Foreground detector processor 106 outputs include an indication of which pixels are part of the foreground and which pixels are not part of the foreground. In some embodiments, foreground detection comprises modeling the background. Building a model of the background and updating that model over time allows the classification of pixels into foreground or background. The background pixels are the pixels that remain relatively stable over a relatively long period of time. Foreground pixels are pixels corresponding to objects that do not remain relatively stable. In some embodiments, a model of the background is constructed by identifying pixels that remain constant to within a certain variation in range or disparity. In some embodiments, a model of the background is constructed by identifying pixels that remain constant to within a certain variation in color or intensity and/or range over a period of time (for example, a time based at least in part on a relevant time constant for the motion of interest in the source images) and indicating that these pixels are background pixels.

In some embodiments, input interface 102, pixel handling processor 104, and foreground detector processor 106 are arranged in a pipeline architecture where each block is processing in parallel or at the same time. In some embodiments, only a subset of image information is required by each block so that, depending on the latency of each block and the size of the subset of information required by each block, a number of blocks are operating on pixel data from the same frame period at the same time, where a frame period is the time between frames of image data. In various embodiments, input interface 102, pixel handling processor 104, and foreground detector processor 106 are integrated circuits disposed on a common substrate or as part of a common integrated circuit package.

Figure 2:
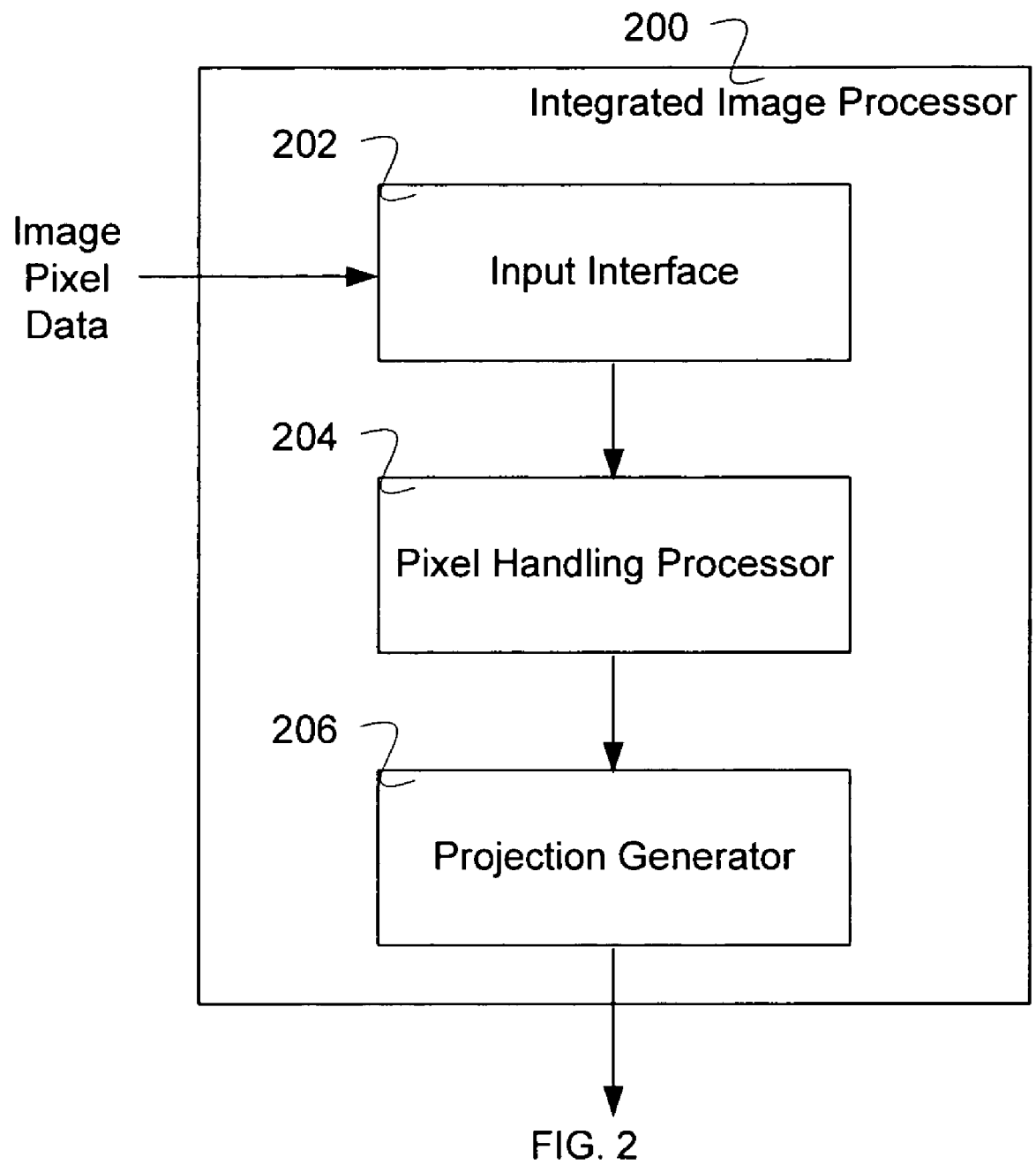
FIG. 2 is a block diagram illustrating an embodiment of an integrated image processor.

FIG. 2 is a block diagram illustrating an embodiment of an integrated image processor. In the example shown, integrated image processor 200 includes input interface 202, pixel handling processor 204, and projection generator 206. Input interface 202 inputs include pixel data from two or more sources. The sources provide image data that allow depth information to be calculated. In some embodiments, the pixel data include intensity information, color information (for example, red, green, blue, luminance, chrominance, saturation, and/or intensity information), vertical synchronization information, and horizontal synchronization information. Input interface 202 outputs pixel data to pixel handling processor 204. Pixel handling processor 104 output include one or more of the following: depth information, disparity information, and validity information. Pixel handling processor 204 grabs the one or more images of pixel data, rectifies the one or more images by removing distortions from lenses and cameras, and calculates depth or disparity. Projection generator 206 inputs include depth information or disparity information, an optional input mask, and/or validity information. Projection generator 206 outputs include one or more of the following: a 3-dimensional (3D) data set or a 2-dimensional projection of the 3D data. The 3-dimensional data set is a transformed, quantized 3D representation of the input data. The quantization is independent for each axis. Input depth pixels are mapped into cells of the 3D map based on desired quantization and camera calibration parameters. Statistics for pixels falling into each cell may be maintained including for example: count, minimum and/or maximum value on a given axis, and/or color characteristics. In some embodiments, a 3D rigid transform, consisting of a 3D rotation, translation, and scaling, is applied during the mapping into the 3D projection volume. The 2-dimensional data set is an embodiment of the 3D data set in which one dimension has quantization 1, i.e. is the projection of the 3D data along that axis. In some embodiments, useful statistics (for example, minimum spatial extent, intensity, or color values, maximum spatial extent, intensity, or color values, histograms) are stored as part of the projection data set. For example, for a top down projection of a room it is useful (for example, for locating the floor or a person) to know the minimum or maximum height for a given location; this can be derived by storing the lowest or highest spatial location mapped to a cell.

In some embodiments, the projection statistics are rescaled. For example, a closer object to the imaging source of a given size will have a greater number of pixels representing it as compared to a farther object of the same given size. A correction to rescale the pixel counts for a given projection cell based on the distance to the image source can be calculated and applied for the 2-dimensional or 3-dimensional projection data set. In various embodiments, a threshold is applied before rescaling, after rescaling, or before and after rescaling.

In some embodiments, input interface 202, pixel handling processor 204, and projection generator 206 are arranged in a pipeline architecture where each block is processing in parallel or at the same time. In some embodiments, only a subset of image information is required by each block so that, depending on the latency of each block and the size of the subset of information required by each block, a number of blocks are operating on pixel data from the same frame period at the same time. In various embodiments, input interface 202, pixel handling processor 204, and projection generator 206 are integrated circuits disposed on a common substrate or as part of a common integrated circuit package.

Figure 3:
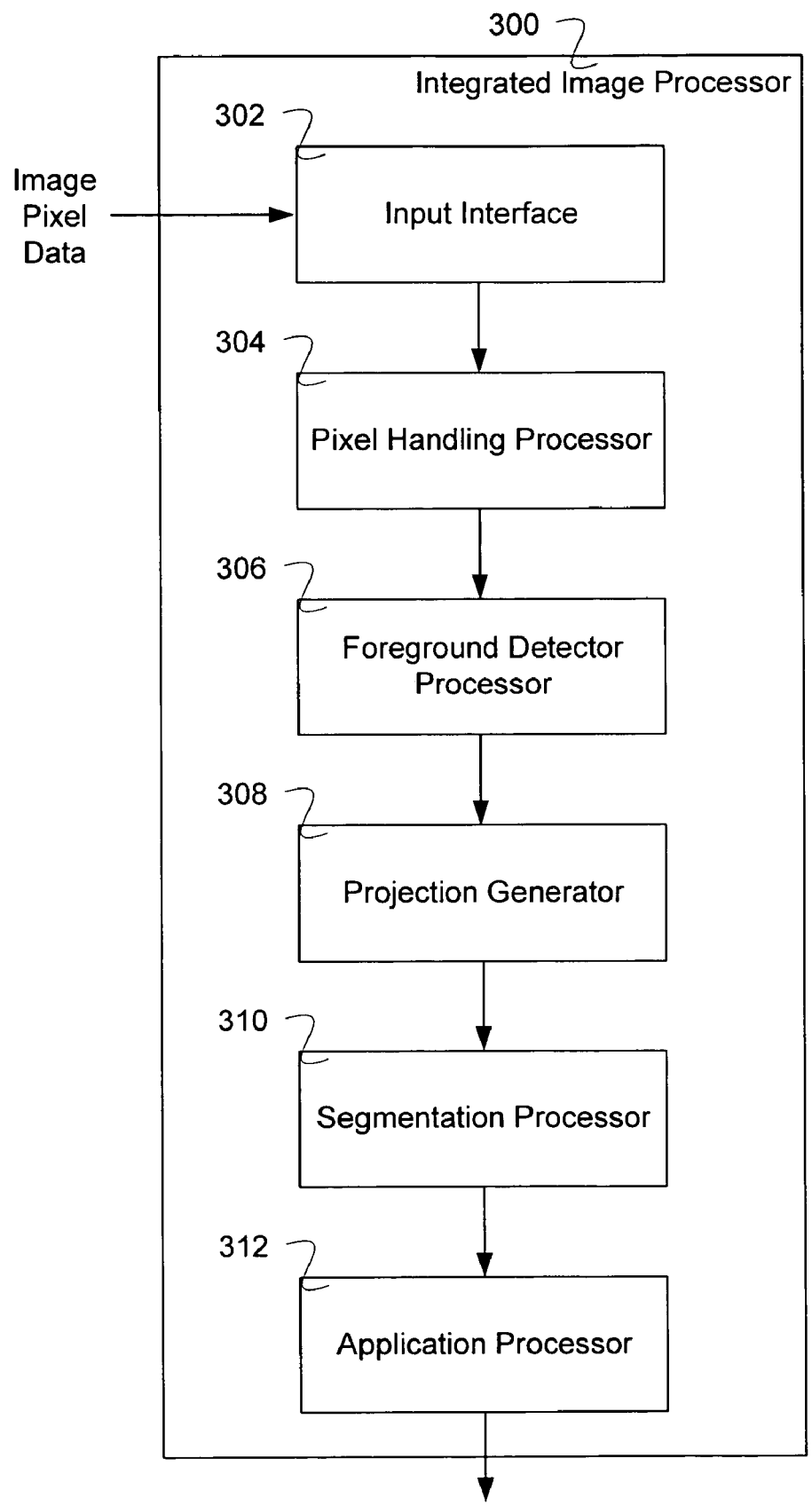
FIG. 3 is a block diagram illustrating an embodiment of an integrated image processor.

FIG. 3 is a block diagram illustrating an embodiment of an integrated image processor. In the example shown, integrated image processor 300 includes input interface 302, pixel handling processor 304, foreground detector processor 306, projection generator 308, segmentation processor 310, and application processor 312. Input interface 302 inputs include pixel data from two or more sources. The sources provide image data that allow depth information to be calculated. In some embodiments, the pixel data include intensity information, color information (for example, red, green, blue, luminance, chrominance, saturation, other spectral bands such as UV or thermal IR, and/or intensity information), vertical synchronization information, and horizontal synchronization information. Input interface 302 outputs pixel data to pixel handling processor 304. Pixel handling processor 104 outputs include two or more of the following: depth information, disparity information, and validity information. Pixel handling processor 304 accepts a coordinate stream of pixel data from two or more sources, rectifies the pixel streams by removing distortions from lenses and cameras, and calculates depth or disparity.

Foreground detector processor 306 inputs include depth information or disparity information, and/or validity information. Foreground detector processor 306 outputs include an indication of which pixels are part of the foreground and which pixels are not part of the foreground. The indication of which pixels are part of the foreground is indicated by a data array of one bit per pixel. In some embodiments, foreground detection comprises modeling the background. The classification of pixels into foreground or background comes from building a model of the background and updating that model over time. The background pixels are the pixels that remain relatively stable over a relatively long period of time. Projection generator 308 inputs include depth information or disparity information, and/or validity information. Projection generator 308 inputs include depth information or disparity information, an optional input mask, and/or validity information. Projection generator 308 outputs include one or more of the following: a 3-dimensional data set or a 2-dimensional projection of the 3D data.

Segmentation processor 310 inputs include the outputs of projection generator 308. Segmentation processor 310 calculations include smoothing, thresholding, and connecting elements of the 2-dimensional projection data set or 3-dimensional data set to create a list of objects and descriptors of those objects. For example, in a 2-dimensional projection data set parallel to the floor of a room, objects are segmented using a smoothing filter on the counts of neighboring cells, applying a threshold to the smoothed values to help in detecting object boundaries, and identifying locally connected regions remaining as objects of interest. Each object can be described in terms of spatial location 3D physical extent, color, etc. In some embodiments, one or more edge detection filters are used to identify boundaries around objects. In some embodiments, segmentation processor 310 detects which areas in the top or plan view projection represent an object (for example, a person).

Application processor 312 inputs include the outputs of the segmentation processor 310. In various embodiments, application processor 312 can count objects, classify objects, track objects, or detect patterns in the objects. For example, application 312 can count cars by identifying objects with an extent that is large enough to be a vehicle on top of a road surface and counting each object as a car. In another example, application 312 can classify the vehicles to differentiate between cars and trucks using the different descriptors of the objects—cars are not as tall as, are narrower than, and are less long than a truck. As another example, in situations where a card key swipe is required to enter through a door, identifying the pattern of two people moving through the door on one card swipe can indicate that there is breach of security. In some embodiments, application processor 312 tracks people by comparing the location of the people in a current frame to prior locations and assigns person identifiers based on the spatial correspondence of the people in the frames.

In some embodiments, input interface 302, pixel handling processor 304, foreground detector processor 306, projection generator 308, segmentation processor 310, and application processor 312 are arranged in a pipeline architecture where each block is processing in parallel or at the same time. In some embodiments, only a subset of image information is required by each block so that, depending on the latency of each block and the size of the subset of information required by each block, a number of blocks are operating on pixel data from the same frame period at the same time. In various embodiments, input interface 302, pixel handling processor 304, foreground detector processor 306, projection generator 308, segmentation processor 310, and application processor 312 are integrated circuits disposed on a common substrate or as part of a common integrated circuit package.

Figure 4:
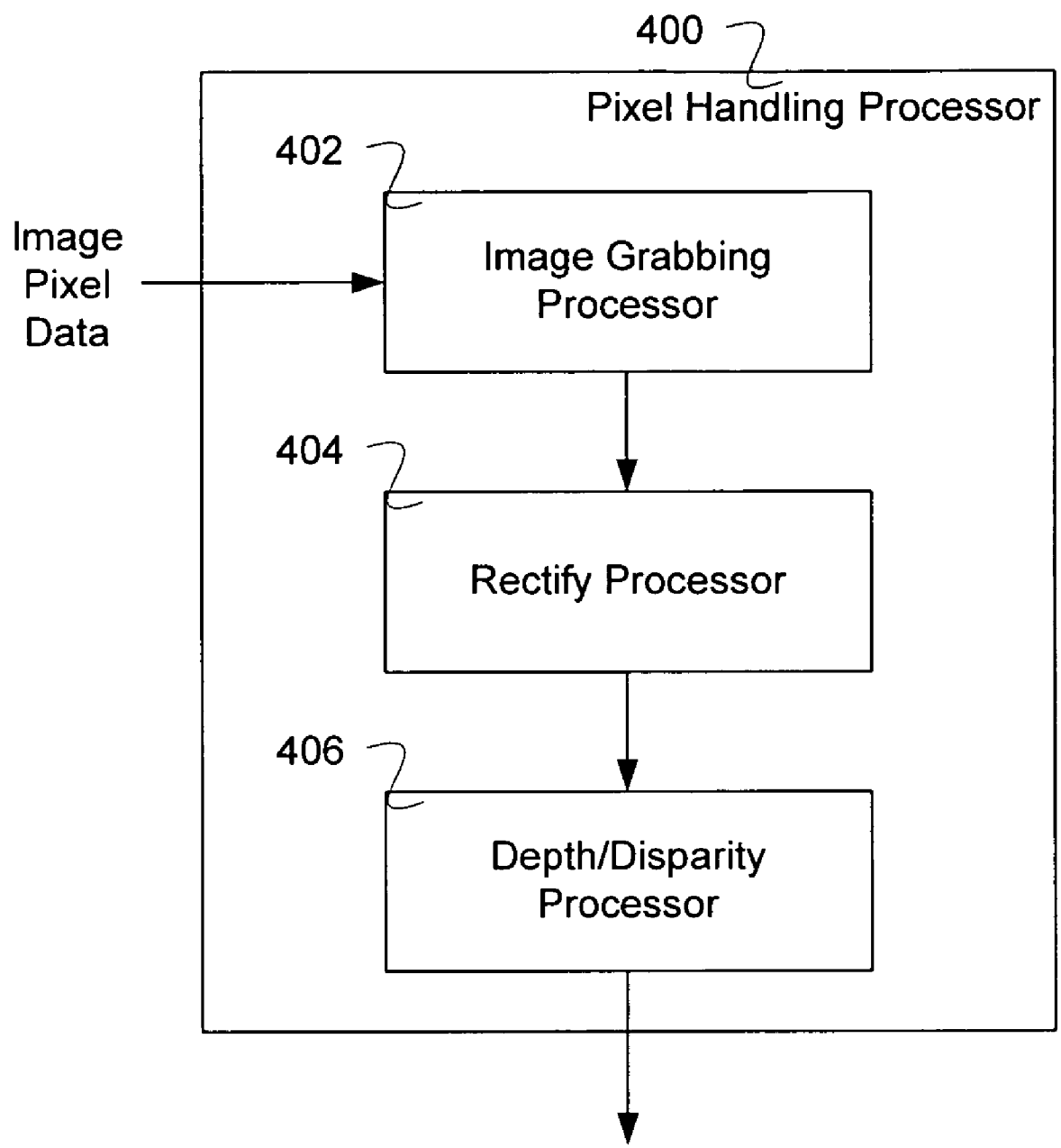
FIG. 4 is a block diagram illustrating an embodiment of a pixel handling processor.

FIG. 4 is a block diagram illustrating an embodiment of a pixel handling processor. In various embodiments, pixel handling processor 400 in FIG. 4 is used to implement 104 of FIG. 1, 204 of FIG. 2, and 304 of FIG. 3. In the example shown, pixel handling processor 400 includes image grabbing processor 402, rectify processor 404, and depth/disparity processor 406. In some embodiments the pixel handling processor does not include a rectify processor. Image grabbing processor 402 inputs include image information from two or more sources in a roughly synchronous manner. Image information depends on the source and can include intensity and color information in a number of formats (for example, RGB—red, green, blue, HSV—hue, saturation, value, HSB—hue, saturation, brightness, or YUV—luminance and two chrominance values, or any other appropriate image information format including other spectral bands) for pixels (image elements) and vertical and horizontal synchronization information. Image grabbing processor 402 outputs synchronous image information for two or more images in a single format.

Rectify processor 404 has as input the outputs from image grabber 402 and source (for example, cameras, color imagers, monochrome imagers, etc.) predetermined calibration parameters (for example, relative imager positions and orientations, lens principal points, focal lengths, and lens distortion parameters). Rectify processor 404 "rectifies", corrects for geometric misalignment and lens distortion, each input source (in some cases removal of all distortions and misalignments is not possible). Lens and camera distortions and position corrections are removed by rotation, translation, magnification, and distortion removal operations to the images. In some embodiments, rotation, translation, and magnification are achieved using matrix operations on the image information. In some embodiments, distortion removal is achieved using a polynomial distortion removal model. The combinations of the geometric and distortion corrections results in mappings from rectified image pixel coordinates to distorted image pixel coordinates. In some embodiments, mappings from rectified image pixel coordinates to distorted image pixel coordinates can be stored in the form of precalculated lookup tables. In some embodiments, the mappings can be computed on the fly during rectification of the pixel streams. In some embodiments, the mappings do not match any exact distorted image pixel coordinates so that interpolation is required to derive the rectified pixel coordinate and/or pixel value. In various embodiments, interpolation is linear interpolation, spline interpolation, or any other appropriate interpolation. Rectify processor 404 operations require a subset of image information for calculation of each pixel. In some embodiments, a pipelining architecture is used to perform calculations in parallel where only the subset of image information required for calculating a given pixel information is required by rectify processor 404.

Depth/disparity processor 406 inputs include the output information from rectify processor 404. Depth/disparity processor 406 calculates the disparity of pixels in the input images by correlating pixel data between the two or more images and/or the depth, or range from the source, based at least in part on calibration parameters. The depth and/or disparity calculation is performed by correlating one or more pixels along a dimension of the image. In some embodiments, an array of pixel values from one image is correlated with pixel values from another image. In some embodiments, a non-parametric correlation is used. In various embodiments, SLOG (sign bits of Laplacian of Gaussian), SAD (sum of absolute differences), SSD (sum of squared differences), etc., may be used for correlation. In some embodiments, validity information is provided as an output for the depth/disparity processor block. Validity information can be derived from checking the correspondence between calculating the disparity between, for example, image 1 and image 2 and then image 2 and image 1. In some embodiments, if the pixel area in the image is smooth, then the depth information is less likely to be valid. In various embodiments, intensity and/or color information is used to calculate depth and/or disparity.

In some embodiments, image grabbing processor 402, rectify processor 404, and depth/disparity processor 406 are arranged in a pipeline architecture where each block is processing in parallel or at the same time. In some embodiments, only a subset of image information is required by each block so that, depending on the latency of each block and the size of the subset of information required by each block, a number of blocks are operating on pixel data from the same frame period at the same time. In various embodiments, image grabbing processor 402, rectify processor 404, and depth/disparity processor 406 are integrated circuits disposed on a common substrate or as part of a common integrated circuit package.

In some embodiments, pixel handling processor 400 does not include depth/disparity processor 406. In this case, pixel handling processor 400 has as input one or more images of information containing range, or depth, information for each pixel. Foreground detector processor 106 or projection processor 206 can then operate on input range information based at least in part on the one or more input images with range information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An integrated image processor implemented on a substrate comprising:
    an input interface configured to receive pixel data from one or more images; and
    a pixel handling processor disposed on the substrate configured to convert the pixel data from the input interface into depth pixel data; and
    a foreground detector processor disposed on the substrate configured to classify pixels from the pixel handling processor as background or not background, wherein the output of the foreground detector processor comprises one bit per pixel indicating whether the pixel is classified as background or not background, and wherein a background pixel comprises a pixel that is determined to be relatively stable using a model of the pixel's behavior over time, and wherein the pixel handling processor and the foreground detector are arranged in a low latency pipelined architecture such that each are operating on pixel data from the one or more input images at the same time, and wherein the foreground detector processor includes storage for the model of each pixel's behavior over time, wherein the pixel handling processor only requires a subset of its input image to produce an output depth pixel data, and wherein the foreground detector only requires a subset of an input range image to classify a pixel as foreground or background.

2. An integrated image processor implemented on a substrate as in claim 1, further including a segmentation processor, wherein the segmentation processor determines a list of zero or more object descriptions, wherein one description of the list comprises a 3D location and a 3D physical extent.

3. An integrated image processor implemented on a substrate as in claim 1, further including an application processor.

4. An integrated image processor implemented on a substrate as in claim 1, further including a projection generator disposed on the substrate configured to generate a projection in space of the depth pixel data received from the pixel handling processor, wherein the projection applies a 3D rotation and translation to the depth data and maps the transformed depth pixel data into a plurality of cells, and wherein one or more statistics for each cell of the plurality of cells are computed based at least in part on the transformed depth pixel data mapped into each cell, and wherein the projection generator also receives the output of the foreground detector and determines, based at least in part on the one bit per pixel output from the foreground detector, whether a depth pixel is not background, and in the event that the depth pixel is not background, the projection generator processes the depth pixel, and in the event that the depth pixel is background, the projection generator does not process the depth pixel, and wherein the pixel handling processor only requires a subset of its input data to produce an output depth pixel data, and wherein the projection generator only requires a subset of its input data to update a first cell in an output array of the projection generator, and wherein the projection generator processor includes storage for the one or more statistics for each cell of the plurality of cells.

5. An integrated image processor implemented on a substrate as in claim 1, wherein the pixel handling processor includes an image grabbing processor.

6. An integrated image processor implemented on a substrate as in claim 1, wherein the pixel handling processor includes a rectify processor.

7. An integrated image processor implemented on a substrate as in claim 1, wherein the pixel handling processor includes a depth processor.

8. An integrated image processor implemented on a substrate as in claim 1, wherein depth comprises disparity.

9. An integrated image processor implemented on a substrate comprising:
    an input interface configured to receive pixel data from one or more images;
    a pixel handling processor disposed on the substrate configured to convert the pixel data from the input interface into depth pixel data; and
    a projection generator disposed on the substrate configured to generate a projection in space of the depth pixel data received from the pixel handling processor, wherein the projection applies a 3D rotation and translation to the depth data and maps the transformed depth pixel data into a plurality of cells, and wherein one or more statistics for each cell of the plurality of cells are computed based at least in part on the depth pixel data mapped into each cell, and wherein the pixel handling processor and the projection generator are arranged in a low latency pipelined architecture such that each are operating on pixel data from the one or more input images at the same time, and wherein the pixel handling processor only requires a subset of its input data to produce an output depth pixel data, and wherein the projection generator only requires a subset of its input data to update a first cell in an output array of the projection generator, and wherein the projection generator processor includes storage for the one or more statistics for each cell of the plurality of cells.

10. An integrated image processor implemented on a substrate as in claim 9, further including a segmentation processor, wherein the segmentation processor determines a list of zero or more object descriptions, wherein one description of the list comprises a 3D location and a 3D physical extent.

11. An integrated image processor implemented on a substrate as in claim 9, further including an application processor.

12. An integrated image processor implemented on a substrate as in claim 9, wherein the pixel handling processor includes an image grabbing processor.

13. An integrated image processor implemented on a substrate as in claim 9 wherein the pixel handling processor includes a rectify processor.

14. An integrated image processor implemented on a substrate as in claim 9, wherein the pixel handling processor includes a depth processor.

15. An integrated image processor implemented on a substrate as in claim 9, wherein depth comprises disparity.

16. An integrated image processor implemented on a substrate comprising:

an input interface configured to receive pixel data from one or more images; and a pixel handling processor disposed on the substrate configured to convert the pixel data from the input interface into depth pixel data; and a foreground detector processor disposed on the substrate configured to classify depth pixels from the pixel handling processor as background or not background, wherein a background pixel comprises a pixel that is determined to be relatively stable using a model of the pixel's behavior over time;

a projection generator disposed on the substrate configured to generate a projection in space of the depth pixel data determined by the pixel handling processor, wherein the projection applies a 3D rotation and translation to the depth pixel data and maps the transformed depth pixel data into a plurality of cells, and wherein one or more statistics for each cell of the plurality of cells are computed based at least in part on the depth pixel data mapped into each cell, and wherein the pixel handling processor, the foreground detector, and the projection generator are arranged in a low latency pipelined architecture such that each are operating on pixel data from the one or more input images at the same time, and wherein the projection generator also receives the output of the foreground detector and determines, based at least in part on the one bit per pixel output from the foreground detector, whether a depth pixel is not background, and in the event that the depth pixel is not background, the projection generator processes the depth pixel, and in the event that the depth pixel is background, the projection generator does not process the depth pixel, and wherein the pixel handling processor only requires a subset of its input data to produce an output depth pixel, and wherein the projection generator only requires a subset of its input data to update a first cell in an output array of the projection generator, and wherein the projection generator processor includes storage for the one or more statistics for each cell of the plurality of cells, and wherein the foreground detector processor includes storage for the model of the pixel's behavior over time, and wherein the foreground detector only requires a subset of its input image data to produce an output pixel;

a segmentation processor disposed on the substrate configured to compute from the output of the projection generator a list of zero or more individual object descriptions, wherein one description of the list comprises a 3D location and a 3D physical extent; and an application processor disposed on the substrate configured to receive the list of zero or more individual object descriptions output by the segmentation processor.

17. An integrated image processor implemented on a substrate as in claim 16, wherein the application processor produces a count of people output.

18. An integrated image processor implemented on a substrate as in claim 16, wherein the application processor produces a count of cars output.

19. An integrated image processor implemented on a substrate as in claim 16, wherein the application processor produces a count of objects output.

20. An integrated image processor implemented on a substrate as in claim 16, wherein the application processor produces a detection of objects output.

21. An integrated image processor implemented on a substrate as in claim 16, wherein the application processor produces a tracking of objects output.

22. An integrated image processor implemented on a substrate as in claim 16, wherein the application processor produces an identification of obstacles output.

23. An integrated image processor implemented on a substrate as in claim 16, wherein the application processor produces a detection of a navigable path output.

24. An integrated image processor implemented on a substrate as in claim 16, wherein the application processor produces an identification of a tailgater output.

25. An integrated image processor implemented on a substrate as in claim 1, wherein the pixel handling processor disposed on the substrate is further configured to convert the pixel data from the input interface into intensity pixel data, and wherein the foreground detector takes as input both depth and intensity data from the pixel handling processor.

26. An integrated image processor implemented on a substrate as in claim 9, wherein the pixel handling processor disposed on the substrate is further configured to convert the pixel data from the input interface into intensity pixel data, and wherein the projection generator takes as input both depth and intensity data from the pixel handling processor, and wherein the projection generator may include statistics related to intensity for each cell.

27. An integrated image processor implemented on a substrate as in claim 16, wherein the pixel handling processor disposed on the substrate is further configured to convert the pixel data from the input interface into intensity pixel data, and wherein the foreground detector and the projection generator take as input both depth and intensity data from the pixel handling processor, and wherein the projection generator may include statistics related to intensity for each cell.

* * * * *

UNITED STATES PATENT AND TRADEMARK OFFICE
CERTIFICATE OF CORRECTION

PATENT NO. : 7,664,315 B2 Page 1 of 1
APPLICATION NO. : 11/264760
DATED : February 16, 2010
INVENTOR(S) : Woodfill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this

Thirtieth Day of November, 2010

David J. Kappos
*Director of the United States Patent and Trademark Office*